(12) United States Patent
Jeong et al.

(10) Patent No.: US 12,720,614 B2
(45) Date of Patent: Aug. 25, 2026

(54) APPARATUS AND METHOD FOR SUPPORTING SLICE INTERWORKING

(71) Applicant: Samsung Electronics Co., Ltd., Gyeonggi-do (KR)

(72) Inventors: Sangsoo Jeong, Gyeonggi-do (KR); Hoyeon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 540 days.

(21) Appl. No.: 18/014,502

(22) PCT Filed: Jul. 29, 2021

(86) PCT No.: PCT/KR2021/009887
§ 371 (c)(1),
(2) Date: Jan. 5, 2023

(87) PCT Pub. No.: WO2022/025669
PCT Pub. Date: Feb. 3, 2022

(65) Prior Publication Data

US 2023/0247686 A1 Aug. 3, 2023

(30) Foreign Application Priority Data

Jul. 30, 2020 (KR) ........................ 10-2020-0095166
Jul. 29, 2021 (KR) ........................ 10-2021-0099770

(51) Int. Cl.
*H04W 76/10* (2018.01)
*H04W 8/24* (2009.01)
(Continued)

(52) U.S. Cl.
CPC ............. *H04W 76/10* (2018.02); *H04W 8/24* (2013.01); *H04W 48/02* (2013.01); *H04W 48/18* (2013.01);
(Continued)

(58) Field of Classification Search
CPC ..... H04W 60/00; H04W 48/18; H04W 76/10; H04W 60/04; H04W 28/0247;
(Continued)

(56) References Cited

U.S. PATENT DOCUMENTS 11,284,341 B2 * 3/2022 Yao ........................ H04M 15/66
11,800,576 B2 * 10/2023 Youn ..................... H04W 76/10
(Continued)

FOREIGN PATENT DOCUMENTS

EP 4 218 301 8/2023
EP 3697022 B1 * 11/2023 .......... H04W 36/144
(Continued)

OTHER PUBLICATIONS

Samsung, "KI #6, New Sol: Interworking Support", S2-2005524, SA WG2 Meeting #140E, Aug. 19-Sep. 1, 2020, 4 pages.
(Continued)

*Primary Examiner* — Matthew C Sams
(74) *Attorney, Agent, or Firm* — The Farrell Law Firm, P.C.

(57) ABSTRACT

The present disclosure relates to a communication technique for combining, with IoT technology, a 5G communication system for supporting a higher data transmission rate than a 4G system, and to a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. The present disclosure relates to a method and an apparatus for providing service continuity when communication is switched from one wireless access network to another in a system in which a plurality of wireless communication technologies can interwork.

15 Claims, 9 Drawing Sheets

(51) Int. Cl.

| | |
|---|---|
| ***H04W 48/02*** | (2009.01) |
| ***H04W 48/18*** | (2009.01) |
| ***H04W 60/00*** | (2009.01) |
| ***H04W 80/10*** | (2009.01) |
| ***H04W 88/18*** | (2009.01) |
| ***H04W 92/02*** | (2009.01) |

(52) U.S. Cl.
CPC ............ *H04W 60/00* (2013.01); *H04W 80/10* (2013.01); *H04W 88/18* (2013.01); *H04W 92/02* (2013.01)

(58) Field of Classification Search
CPC ........... H04W 28/088; H04W 28/0925; H04W 36/0022; H04W 48/04; H04W 48/06; H04W 60/06; H04W 76/12; H04W 8/02; H04W 8/065; H04W 8/14; H04W 16/04; H04W 24/02; H04W 28/16; H04W 28/26; H04W 36/0027; H04W 36/0066; H04W 36/13; H04W 36/24; H04W 36/322; H04W 48/02; H04W 48/16; H04W 60/005; H04W 76/16; H04W 8/00; H04W 8/06; H04W 8/082; H04W 8/22; H04W 8/24; H04W 80/10; H04W 84/00; H04W 84/042; H04W 88/06; H04W 88/16; H04W 88/18; H04W 92/02; H04L 43/0876; H04M 15/66
See application file for complete search history.

(56) References Cited

U.S. PATENT DOCUMENTS

| | | | | |
|---|---|---|---|---|
| 11,979,823 | B2 * | 5/2024 | Jeong | H04W 48/18 |
| 12,232,191 | B2 * | 2/2025 | Youn | H04W 76/32 |
| 2018/0317134 | A1 * | 11/2018 | Leroux | H04W 28/26 |
| 2019/0124561 | A1 * | 4/2019 | Faccin | H04W 48/18 |
| 2019/0124589 | A1 * | 4/2019 | Bogineni | H04W 48/18 |
| 2019/0387411 | A1 | 12/2019 | Choi et al. | |
| 2020/0236528 | A1 * | 7/2020 | Lee | H04W 8/082 |
| 2020/0245127 | A1 * | 7/2020 | Zong | H04W 36/0066 |
| 2021/0105196 | A1 * | 4/2021 | Dao | H04L 47/24 |
| 2022/0104115 | A1 * | 3/2022 | Jeong | H04W 48/06 |
| 2022/0377655 | A1 * | 11/2022 | Keller | H04W 60/00 |
| 2023/0018958 | A1 * | 1/2023 | Gan | H04W 36/302 |
| 2023/0084453 | A1 * | 3/2023 | Hedman | H04W 60/00 455/435.1 |
| 2023/0189358 | A1 * | 6/2023 | Youn | H04W 76/32 370/328 |
| 2023/0247686 | A1 * | 8/2023 | Jeong | H04W 76/10 455/414.1 |
| 2023/0422320 | A1 * | 12/2023 | Youn | H04W 76/10 |
| 2024/0251341 | A1 * | 7/2024 | Jeong | H04W 48/06 |

FOREIGN PATENT DOCUMENTS

| | | | |
|---|---|---|---|
| JP | 2020-113883 | 7/2020 | |
| KR | 10-2021-0039889 | 4/2021 | |
| WO | 2019/076244 | 4/2019 | |
| WO | WO 2020/069938 | 4/2020 | |
| WO | WO-2021070028 A1 * | 4/2021 | H04W 60/06 |
| WO | WO 2022/065985 | 3/2022 | |
| WO | WO-2022069178 A1 * | 4/2022 | H04W 48/06 |

OTHER PUBLICATIONS

European Search Report dated Sep. 15, 2023 issued in counterpart application No. 21851234.1-1216, 13 pages.

NEC Apple, "KI#2 Sol#10: Updates to Solution #10 Max Number of PDU Sessions Per Network Slice Control", S2-2003625, SA WG2 Meeting #139E, Jun. 1-12, 2020, 4 pages.

NEC, "Update to Solution #2 Max Number of UEs Per Network Slice Control at Registration", S2-2000317, SA WG2 Meeting #136-AH, Jan. 13-17, 2020, 6 pages.

Japanese Office Action dated Jan. 9, 2024 issued in counterpart application No. 2023-504081, 8 pages.

Japanese Office Action dated Aug. 5, 2024 issued in counterpart application No. 2023-504081, 9 pages.

PCT/ISA/210 Search Report issued on PCT/KR2021/009887, Oct. 25, 2021 pp. 5.

PCT/ISA/237 Written Opinion issued on PCT/KR2021/009887, Oct. 25, 2021, pp. 4.

CATT, "KI #1, 2&5, New Sol: Support of network slice quota control and enforcement", S2-2004075, 3GPP TSG-SA WG2 Meeting #139E, Elbonia, May 22, 2020, pp. 8.

NEC, "KI#4 New Sol#X: Network slice quota event notification", S2-2004578, 3GPP TSG-SA WG2 Meeting #139E, Electronic, Elbonia, Jun. 8, 2020, pp. 6.

ZTE, "KI#1,2,4,5, New Sol: Proactive Slice Quota Management in AMF", S2-2004571, 3GPP TSG-SA/WG2 Meeting #138E, Elbonia, Jun. 8, 2020, pp. 6.

Apple, "Solution for Key Issue #2: Support of network slice related quota on maximum number of PDU sessions", S2-2000934, SA WG2 Meeting #136-AH, Incheon, Seoul, Jan. 8, 2020, pp. 10.

Chinese Office Action dated May 21, 2026 issued in counterpart application No. 202180058215.7, 23 pages.

* cited by examiner

FIG. 1

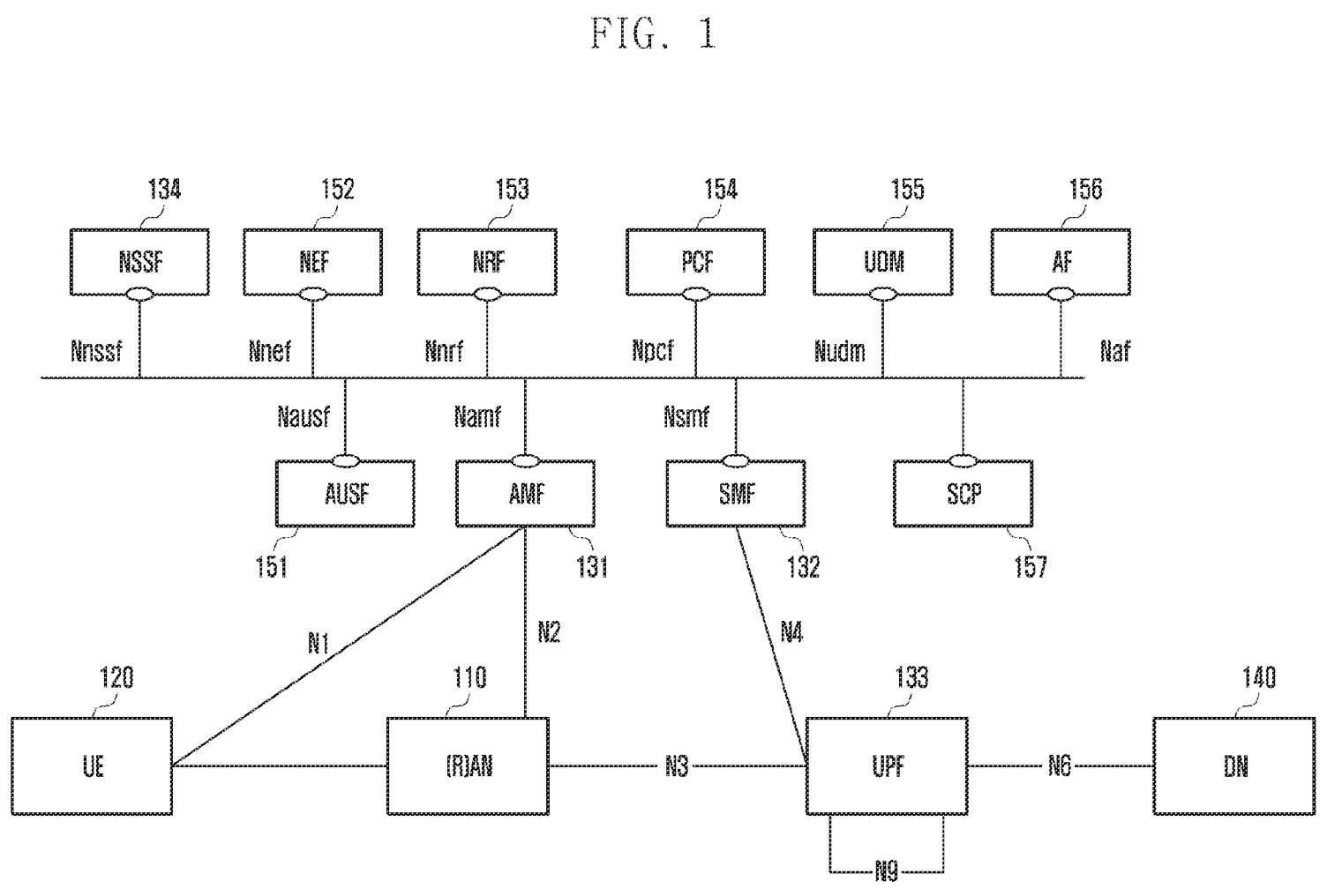

NSSF 134
NEF 152
NRF 153
PCF 154
UDM 155
AF 156
Nnssf
Nnef
Nnrf
Npcf
Nudm
Naf
Nausf
Namf
Nsmf
AUSF 151
AMF 131
SMF 132
SCP 157
N1
N2
N4
UE 120
(R)AN 110
N3
UPF 133
N9
N6
DN 140

FIG. 2

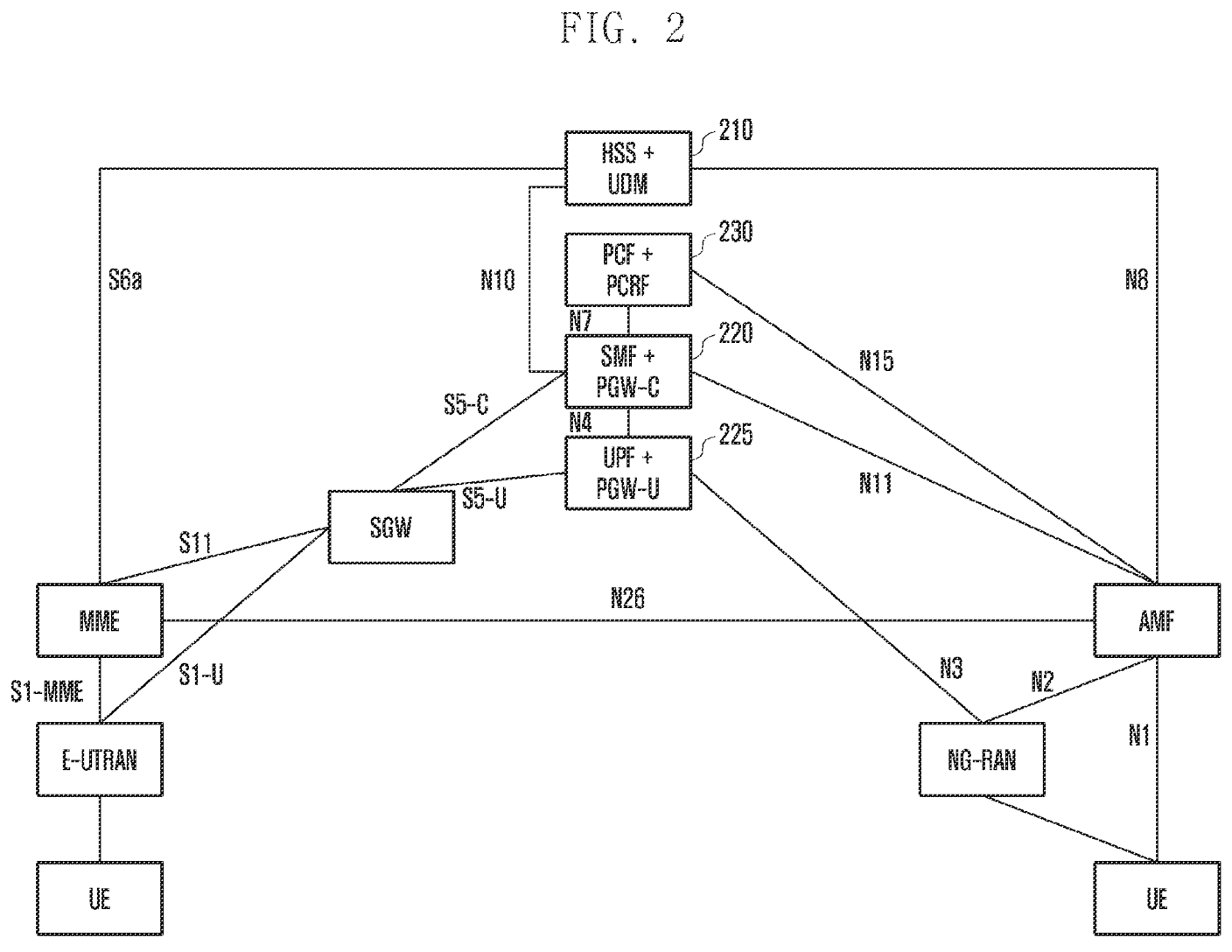

HSS + UDM
210
PCF + PCRF
230
SMF + PGW-C
220
UPF + PGW-U
225
N7
N4
N10
N8
N15
N11
N26
N3
N2
N1
AMF
NG-RAN
UE
SGW
S5-C
S5-U
S11
S1-U
S6a
S1-MME
MME
E-UTRAN
UE

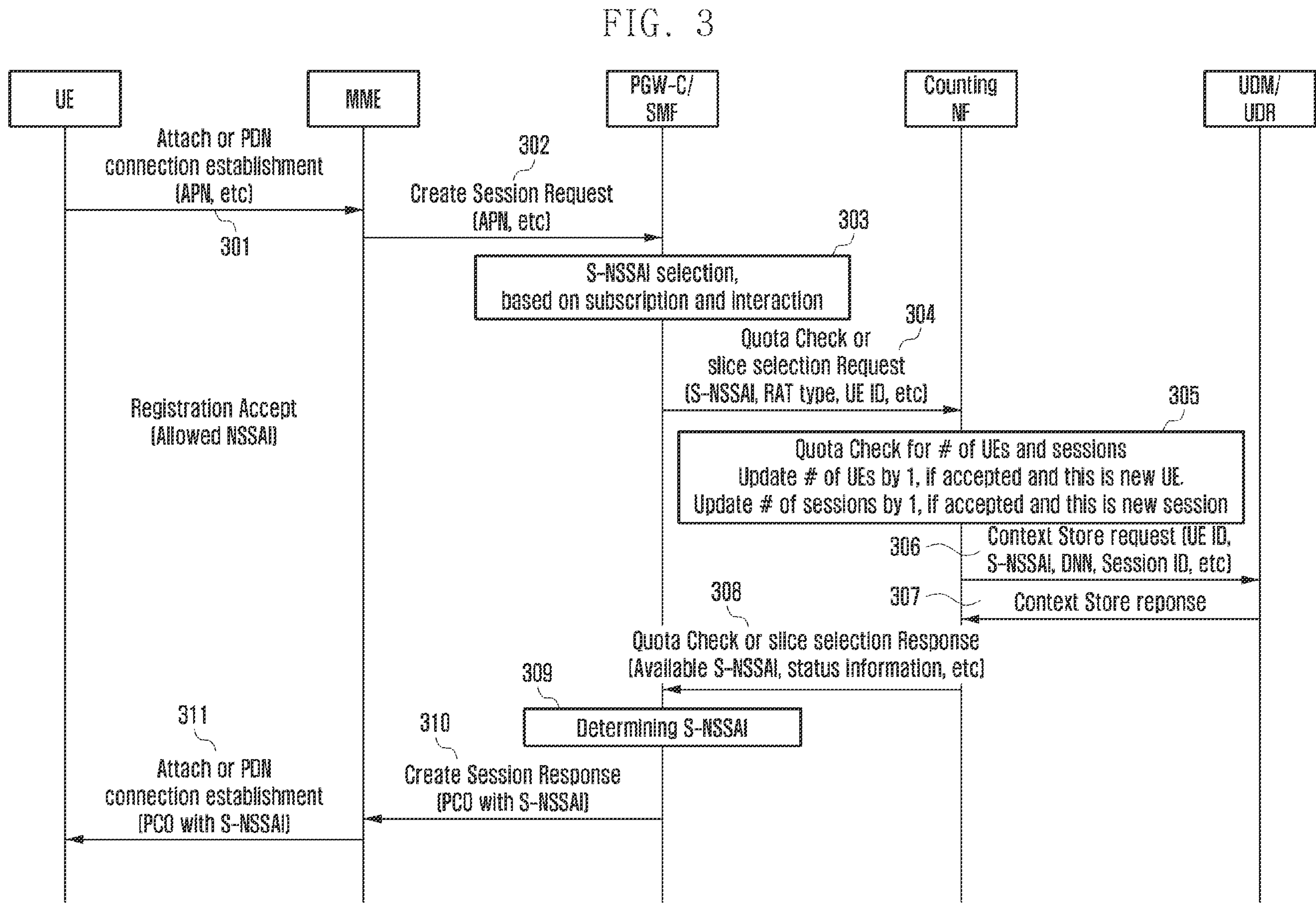
FIG. 3
UE
MME
PGW-C/SMF
Counting NF
UDM/UDR
Attach or PDN connection establishment (APN, etc)
301
302
Create Session Request (APN, etc)
303
S-NSSAI selection, based on subscription and interaction
304
Quota Check or slice selection Request (S-NSSAI, RAT type, UE ID, etc)
Registration Accept (Allowed NSSAI)
305
Quota Check for # of UEs and sessions
Update # of UEs by 1, if accepted and this is new UE.
Update # of sessions by 1, if accepted and this is new session
306
Context Store request (UE ID, S-NSSAI, DNN, Session ID, etc)
307
Context Store reponse
308
Quota Check or slice selection Response (Available S-NSSAI, status information, etc)
309
Determining S-NSSAI
310
Create Session Response (PCO with S-NSSAI)
311
Attach or PDN connection establishment (PCO with S-NSSAI)

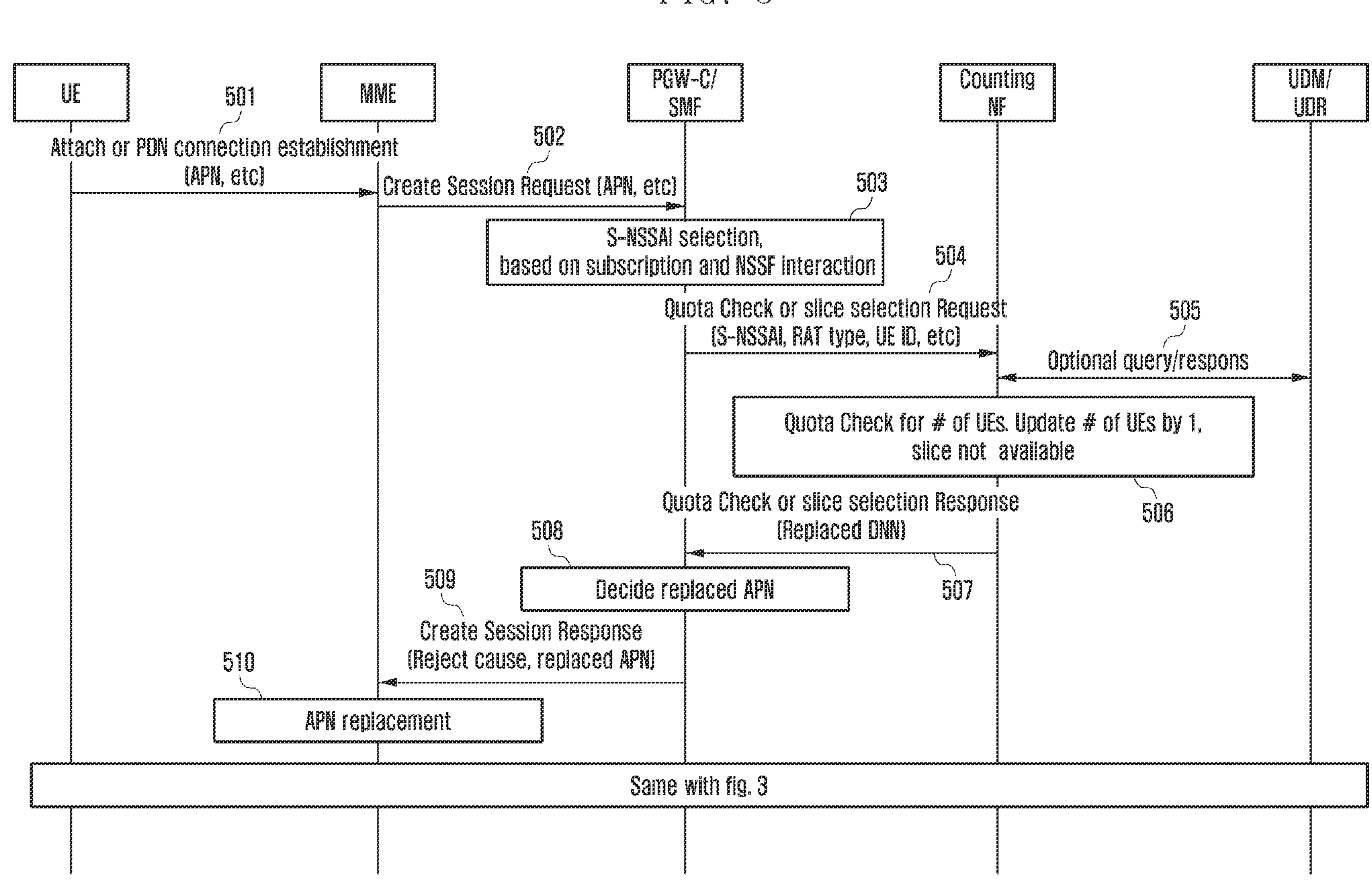

FIG. 5
UE
MME
PGW-C/ SMF
Counting NF
UDM/ UDR
501
Attach or PDN connection establishment (APN, etc)
502
Create Session Request (APN, etc)
503
S-NSSAI selection, based on subscription and NSSF interaction
504
Quota Check or slice selection Request (S-NSSAI, RAT type, UE ID, etc)
505
Optional query/respons
Quota Check for # of UEs. Update # of UEs by 1, slice not available
506
Quota Check or slice selection Response (Replaced DNN)
507
508
Decide replaced APN
509
Create Session Response (Reject cause, replaced APN)
510
APN replacement
Same with fig. 3

APPARATUS AND METHOD FOR SUPPORTING SLICE INTERWORKING

PRIORITY

This application is a National Phase Entry of PCT International Application No. PCT/KR2021/0098877 which was filed on Jul. 29, 2021, and claims priority to Korean Patent Application Nos. 10-2020-0095166 and 10-2021-0099770, which were filed on Jul. 30, 2020 and Jul. 29, 2021, respectively, the entire content of each of which is incorporated herein by reference.

TECHNICAL FIELD

The disclosure relates to a wireless communication system, and more particularly, to a method and device for providing service continuity in the case of switching from a system in which a plurality of wireless communication technologies may be interworked to another wireless access network.

BACKGROUND ART

In order to satisfy increases in demand for wireless data traffic now that a 4G communication system is commercially available, efforts are being made to develop an enhanced 5G communication system or a pre-5G communication system. Therefore, 5G communication system or a pre-5G communication system is referred to as a beyond 4G network communication system or a post long term evolution (LTE) system. The 5G communication system defined by 3GPP is referred to as a new radio (NR) system. In order to achieve a high data transmission rate, consideration is being given to implementing the 5G communication system in a mmWave band (e.g., 60 GHz band). In order mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna have been discussed for the 5G communication system and applied to the NR system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) are being implemented by the technique of beamforming, MIMO, and array antenna. Application of a cloud RAN as the foregoing big data processing technology may be an example of convergence of 5G technology and IoT technology.

Recently, with the development of various information technology (IT) technologies, network equipment has evolved into a virtualized network function (NF) by applying virtualization technology thereto, and virtualized NFs may be implemented in the form of software beyond physical limitations and be installed/operated in various types of clouds or data centers (DCs). In particular, the NF may be freely expanded or scaled, initiated, or terminated according to service requirements, a system capacity, and a network load. Even if these NFs are implemented in the form of software, it should be noted that the physical constitution is not excluded because the NFs should be basically driven on a physical constitution, for example, a predetermined equipment. Further, NFs may be implemented with a simple physical constitution, that is, only hardware.

In order to support various services in these various network structures, network slicing technology has been introduced. Network slicing is technology that logically constitutes a network as a set of network functions (NFs) for supporting a specific service and that separates it from other slices. One terminal may access two or more slices in the case of receiving various services.

DISCLOSURE OF INVENTION

Technical Problem

The disclosure provides a method and device for providing service continuity in the case of switching from a system in which a plurality of wireless communication technologies may be interworked to another wireless access network.

More specifically, the disclosure provides a method and device for supporting the network slicing technology even in the existing network that does not support network slicing technology in the case that a network supporting network slicing technology and a network supporting the existing radio access technology that does not support network slicing technology are interworked.

Solution to Problem

According to an embodiment of the disclosure, a method performed by a first network function entity (SMF+PGW-C) including a session management function (SMF) and a control plane function (PGW-C) of a packet data network gateway (PGW) in a wireless communication system includes receiving a first message requesting packet data network (PDN) connection establishment from a mobility management entity (MME); selecting a network slice related to the PDN connection establishment; transmitting, to a second network function entity configured to perform management on network slice admission, a second message requesting identification of availability of the network slice; receiving, from the second network function entity, a third message including information on availability of the network slice; and transmitting, to the MME, a fourth message including a response to the PDN connection establishment based on the third message, wherein the second message includes an ID of the terminal requesting the PDN connection establishment, and availability of the network slice is identified based on the terminal ID, the number of terminals registered in the network slice, and the number of current PDU sessions of the network slice.

In the method, selecting a network slice related to the PDN connection establishment may further include determining whether access of the selected network slice is controlled by the second network function entity based on information configured in the first network function entity.

Further, if the terminal ID is not registered in the network slice, and the number of registered terminals and the number of current PDU sessions are smaller than the number of maximum terminals and the number of maximum PDU sessions of the network slice, the terminal ID may be registered in the network slice, and the number of registered terminals and the number of current PDU sessions may be increased by 1, and the third message may include information that the network slice is available.

Further, if the terminal ID is already registered in the network slice and the number of current PDU sessions is smaller than the number of maximum PDU sessions of the network slice, the number of current PDU sessions may be increased by 1, and the third message may include information that the network slice is available.

According to another embodiment of the disclosure, a method performed by a second network function entity for performing management of network slice admission in a wireless communication system may include receiving a first message requesting identification of availability of a network slice from a first network function entity (SMF-+PGW-C) including a session management function (SMF) and a control plane function (PGW-C) of a packet data network gateway (PGW); identifying availability of the network slice based on a terminal ID included in the first message, the number of terminals registered in the network slice, and the number of current PDU sessions of the network slice; and transmitting, to the first network function entity, a second message including information on availability of the network slice, wherein the network slice may be related to a packet data network (PDN) connection establishment request from a mobility management entity (MME), the terminal ID included in the first message may be an ID of a terminal requesting the PDN connection establishment, and the PDN connection of the first network function entity and the MME may be established based on the second message.

According to another embodiment of the disclosure, a first network function entity (SMF+PGW-C) including a session management function (SMF) and a control plane function (PGW-C) of a packet data network gateway (PGW) in a wireless communication system may include a transceiver configured to transmit and receive a signal; and a controller connected to the transceiver, wherein the controller may be configured to receive a first message requesting packet data network (PDN) connection establishment from a mobility management entity (MME), to select a network slice related to the PDN connection establishment, to transmit, to a second network function entity configured to perform management on network slice admission, a second message requesting identification of availability of the network slice, to receive, from the second network function entity, a third message including information on availability of the network slice, and to transmit, to the MME, a fourth message including a response to the PDN connection establishment based on the third message, wherein the second message may include an ID of the terminal requesting the PDN connection establishment, and availability of the network slice may be identified based on the terminal ID, the number of terminals registered in the network slice, and the number of current PDU sessions of the network slice.

According to another embodiment of the disclosure, a second network function entity for performing management of network slice admission in a wireless communication system may include a transceiver configured to transmit and receive a signal; and a controller connected to the transceiver, wherein the controller may be configured to receive a first message requesting identification of availability of a network slice from a first network function entity (SMF+PGW-C) including a session management function (SMF) and a control plane function (PGW-C) of a packet data network gateway (PGW), to identify availability of the network slice based on the terminal ID included in the first message, the number of terminals registered in the network slice, and the number of current PDU sessions of the network slice, and to transmit, to the first network function entity, a second message including information on availability of the network slice, wherein the network slice may be related to a packet data network (PDN) connection establishment request from a mobility management entity (MME), the terminal ID included in the first message may be an ID of the terminal requesting the PDN connection establishment, and the PDN connection of the first network function entity and the MME may be established based on the second message.

Advantageous Effects of Invention

According to an embodiment of the disclosure, even in a radio access network that does not support network slices, service continuity between terminals and networks supporting different radio access technologies can be supported by interworking with protocols and operations of radio access networks supporting slices.

BRIEF DESCRIPTION OF DRAWINGS

FIG. 1 is a block diagram illustrating a wireless communication system according to various embodiments of the disclosure.

FIG. 2 is a block diagram illustrating a structure for providing a service by interworking. 5G and 4G (LTE) according to an embodiment of the disclosure.

FIG. 3 is a message flow diagram illustrating a control procedure in consideration of a slice quota when accessing a 4G network according to an embodiment of the disclosure.

FIG. 5 is a message flow diagram illustrating a control procedure in consideration of a slice quota when accessing a 4G network according to an embodiment of the disclosure.

MODE FOR THE INVENTION

Figure 4:
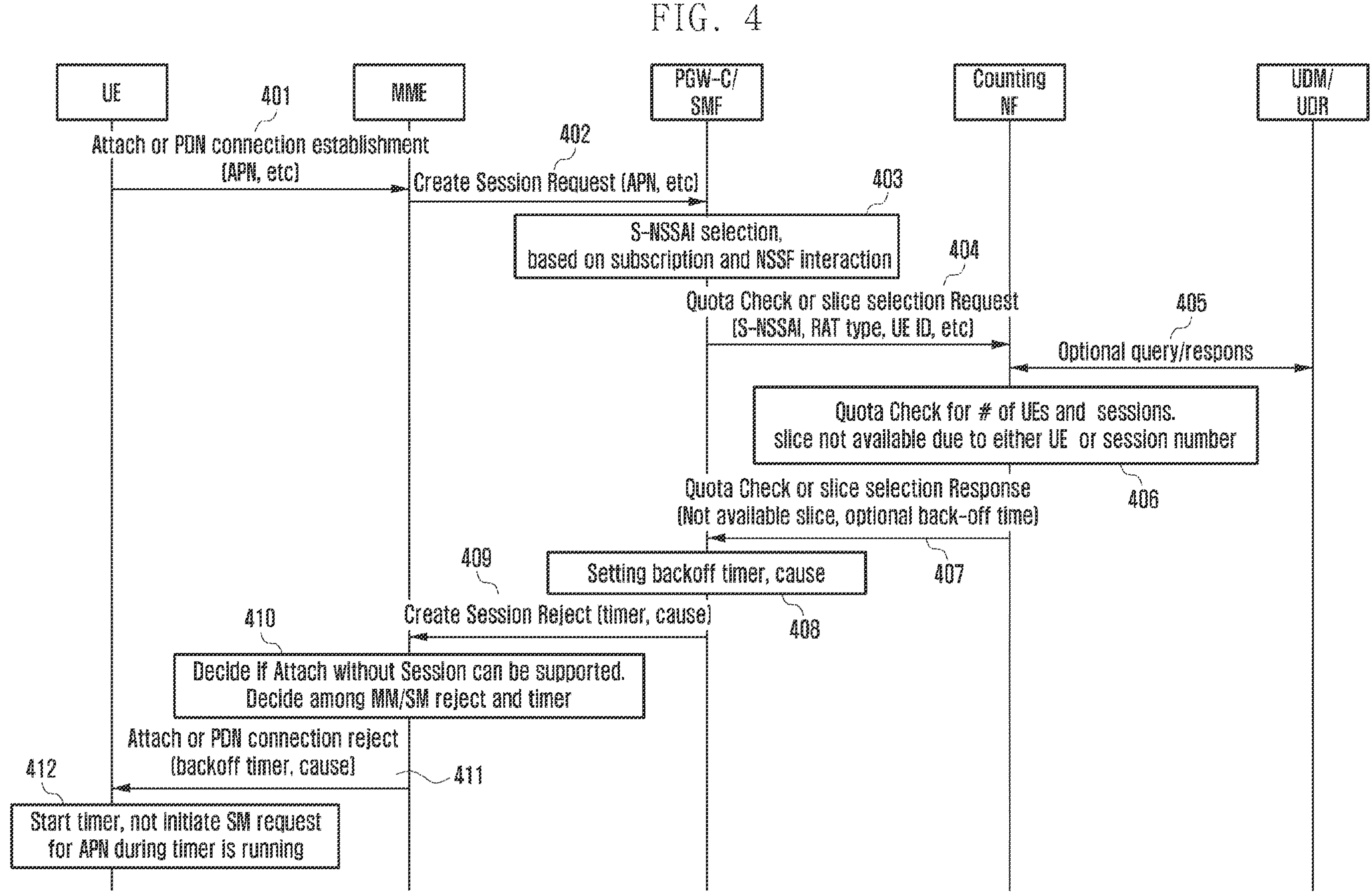
FIG. 4 is a message flow diagram illustrating a control procedure in consideration of a slice quota when accessing a 4G network according to an embodiment of the disclosure.

Hereinafter, preferred embodiments of the disclosure will be described in detail with reference to the accompanying drawings. In this case, it should be noted that in the accompanying drawings, the same components are denoted by the same reference numerals if possible. Further, detailed descriptions of well-known functions and constitutions that may obscure the gist of the disclosure will be omitted.

In describing embodiments in this specification, a description of technical contents that are well known ire the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving then will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer executed process; thus, instructions for performing a computer or other programmable data processing equipment may provide steps for performing functions described in the message flow diagram block(s).

Further, each block may represent a module, a segment, or a portion of a code including one or more executable is for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as FPGA or ASIC, and '-unit' performs certain roles. However, '-unit' is not limited to software or hardware. '-unit' may be formed to reside in an addressable storage medium or may be formed to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-unit' or may be further separated into additional components and '-units'. Further, components and '-units' may be implemented to reproduce one or more CPUs in a device or secure multimedia card.

Terms used in the disclosure are used only for describing specific embodiments, and may not be intended to limit the scope of other embodiments. The singular expression may include the plural expression unless the context clearly dictates otherwise. Terms used herein, including technical or scientific terms, may have the same meanings as commonly understood by one of ordinal skill in the art described in the disclosure. Among the terms used in the disclosure, terms defined in a general dictionary may be interpreted with the same or similar meaning as the meaning the context of the related art, and unless explicitly defined in the disclosure, it is not construed in an ideal or overly formal sense. In some cases, even terms defined in the disclosure cannot be construed to exclude embodiments of the disclosure.

In various embodiments of the disclosure described below, a hardware approach method will be described as an example. However, because various embodiments of the disclosure include technology using both hardware and software, various embodiments of the disclosure do not exclude a software-based approach.

Hereinafter, the disclosure relates to a method and device for supporting various services in a wireless communication system. Specifically, the disclosure describes technology for supporting various services by supporting mobility of a terminal in a wireless communication system.

Hereinafter, a term identifying an access node used in the description, a term indicating a network object (or network entity) or a network function (NF), a term indicating messages, a term indicating an interface between network objects, a term indicating various types of identification information and the like are exemplified for convenience of description. Accordingly, the disclosure is not limited to the terms described below, and other terms indicating objects having equivalent technical meanings may be used.

Hereinafter, for convenience of description, the disclosure uses terms and names defined in 3rd generation partnership project long term evolution (3GPP LTE) and 5G standards. However, the disclosure is not limited by the terms and names, and may be equally applied to systems conforming to other standards.

Hereinafter, for convenience of description, objects for exchanging information for access control and state management will be collectively described as an NF. The NF may be, for example, at least one of an access and mobility management function (hereinafter, referred to as an AMF) device, a session management function (hereinafter, referred to as an SMF) device, or a network slice selection function (NSSF) device. However, embodiments of the disclosure may be equally applied even in the case that the NF is actually implemented into an instance (each of an AMF instance, an SMF instance, and an NSSF instance).

In the disclosure, an instance may mean a specific NF in the form of a software code, and mean a state in which physical and/or logical resources may be allocated and executed from a computing system in order to perform a function of the NF in a physical computing system, for example, a specific computing system exiting on a core network. Therefore, the AMF instance, the SMF instance, and the NSSF instance may mean that physical and/or logical resources may be allocated and used for AMF, SMF, and NSSF operations, respectively from a specific computing system existing on the core network. As a result, in the case that the physical AMF, SMF, and NSSF devices exist, the AMF instance, the SMF instance, and the NSSF instance in which physical and/or logical resources are allocated and used for AMF, SMF, and NSSF operations from a specific computing system existing on the network may perform the same operation. Therefore, in the embodiment of the disclosure, items described as NFs (AMF, SMF, UPF, NSSF, NRF, SCP, and the like) may be replaced with NF instances, or conversely, items described as NF instances may be replaced with NFs and applied. Similarly, in an embodiment of the disclosure, items described as an NW slice may be replaced with NW slice instances, or conversely, items described as NW slice instances may be replaced with NW slices and applied.

FIG. 1 is a block diagram illustrating a wireless communication system according to various embodiments of the disclosure.

With reference to FIG. 1, as a part of nodes using a radio channel in a wireless communication system, a radio access node (RAN) 110 and a user equipment (UE) 120 are illustrated. FIG. 1 illustrates only one RAN 110 and one UE 120, but another RAN identical or similar to the RAN 110 may be further included. Further, FIG. 1 illustrates only a case that only one UE 120 communicates within one RAN 110. However, it is obvious that a plurality of UEs may actually communicate within one RAN 110.

The RAN 110 is a network infrastructure that provides wireless access to the UE 120. The RAN 110 has coverage defined as a certain geographic area based on a distance capable of transmitting a signal (not illustrated in FIG. 1). In addition to the base station, the RAN 110 may be referred to as an 'access point (AP)', 'eNodeB', '5th generation node (5G node)', 'next generation node B (gNB)', 'wireless point', 'transmission/reception point (TRP)', or other terms having an equivalent technical meaning.

The UE 120 is a device used by a user and performs communication with the RAN 110 through a wireless channel. In some cases, the UE 120 may be operated without the user's involvement. For example, the UE 120 is a device that performs machine type communication (MTC) and may not be carried by a user. The UE 120 illustrated in FIG. 1 may include at least one user portable device and include at least one MTC. The UE 120 of FIG. 1 may be referred to as al 'terminal', 'mobile station', 'subscriber station', 'remote terminal', 'wireless terminal', 'user device', or another term having an equivalent technical meaning.

An AMF device 131 may be a network entity that manages wireless network access and mobility for the UE 120. An SMF device may be a network entity that manages a connection of a packet data network for providing wicket data to the UE 120. The connection between the UE 120 and the SMF 132 may be a protocol data unit (PDU) session.

A user plane function (hereinafter, referred to as an UPF) device 133 may be a gateway for transmitting packets transmitted and received by the UE 120 or a network entity serving as a gateway. The UPF 133 may be connected to a data network (DN) 140 connected to the Internet to provide a path for data transmission and reception between the UE 120 and the DN 140. Accordingly, the UPF 133 may route data to be transmitted to the Internet among packets transmitted by the UE 120 to an Internet data network.

A network slice selection function (NSSF) device 134 may be a network entity that performs a network selection operation described in the disclosure, for example, an operation of selecting a network slice. The operation of the NSSF device 134 will be described in more detail in the drawings to be described later.

An authentication server function (AUSF) device 151 may be an equipment (network entity) that provides a service for processing subscriber authentication.

A network exposure function (NEF) device 152 may be a network entity that may access information managing the UE 120 in the 5G network and perform subscription to a mobility management event of the UE, subscription to a session management event of the UE, a request for session related information, a request for session related information, a configuration of charging information for the UE, a request for changing a PDU session policy for the UE, and transmission of small data for the UE.

A network repository function (NRF) device 153 may be an network entity (NF) having a function of storing state information of NFs and processing a request for finding an NF to which other NFs may access.

A policy and charging function (hereinafter, referred to as a PCF) device 154 may be a network entity that applies a service policy of a mobile operator to the UE 120, a charging policy, and a policy for the PDU session.

A united data management (hereinafter, referred to as a UDM) device 155 may be a network entity that stores information on a subscriber and/or the UE 120.

An application function (AF) device 156 may be an NF having a function of providing a service to users by interworking with a mobile communication network.

A service communication proxy (SCP) device 157 is an NF that provides functions such as NF discovery for communication between NFs, and message transmission between NFs. The SCP 157 may operate in an integrated form with the NRF 153 according to the operator's selection, and in this case, the SCP 157 may include a function of the NRF 153 or conversely, the NRF 153 may include a function of the SCP 157.

The above-described AMF device 131, SMF device 132, UPF device 133, NSSF device 134, AUSF device 151, NEF device 152, NRF device 153, PCF device 154, UDM device 155, AF device 156, and SCP device 157 may have the form of software or firmware running in at least one device and/or system. Further, the devices 131, 132, 133, 134, 151, 152, 153, 154, 155, 156, and 157 may be implemented in a hardware form, if necessary. In the following description, the term "device" will be deleted for convenience of description. For example, the AMF device 131 will be described as the AMF 131, and the SMF device 132 will be described as the SMF 132.

In FIG. 1, symbols between connected lines between each network entity, the UE 120, and the RAN 110 may be interfaces of each entity. For example, it may mean that an N1 interface is used between the UE 120 and the AMF 131, an N2 interface is used between the RAN 110 and the AMF 131, and an N3 interface is used between the RAN 110 and the UPF 133. Similarly, an N4 interface may be used between the SMF 132 and the UPF 133, an N9 interface may be used between the UPFs 133 or inside the UPF 133, at an N6 interface may be used between the UPF 133 and the DN 140.

In order to provide a true 5G service to users, 5G cells are provided with full coverage, and terminals should be able to connect to 5G networks anywhere. However, in an initial stage of a 5G service, as 5G cells are partially introduced, the coverage may be limited. Therefore, the 5G network may overcome such a limitation by interworking with the existing, 4G (LTE) network so as to ensure service continuity.

FIG. 2 is a diagram illustrating, a structure for providing a service by interworking 5G (NR) and 4G(LTE).

In order to control the same subscriber, a unified data, management (UDM) 210 and a home subscriber subsystem (HSS) should be interworked with each other, and in order to support session continuity (IP address preservation, and the like), an SMF 220 and UPF 225 should support a function of a packet data network gateway (PDN-GW) (PGW). In this case, a control plane function (PGW-C) of the PGW may be supported by the SMF 220, and a user plane function (PGW-U) of the PGW may be supported by the UPF 225. Further, in order to manage a service policy, a charging policy, and a quality of service (QoS) of a mobile communication operator for the UE, a policy and charging function (PCF) 230 should be interworked with a policy control and charging rules function (PCF). In this way, a network entity to which a 5G network entity and a 4G network entity are coupled may be referred to as an network entity (NF) supporting a plurality of radio access technologies (RAT), a combined NF, and an interworking NF, or a combi node.

Alternatively, it may be understood that each network entity supports a plurality of RATs so as to support an interworking system. That is, it may be understood that the above-described UDM 210, SMF 220, UPF 225, and PCF 230 include functions of a HSS, PGW-control plane (PGW-C). PGW-user plane (PGW-U), and PCRF, respectively and that the 5G network and the 4G network are shared. The interworked/shared network entity may represent interworking/sharing through a symbol '+' or '/' in this specification. For example, an entity in which the SMF is shared with the 4G network interworked with a function of the PGW-C may be expressed as a PGW-C/SMF, a PGW-C+SMF, or an SMF+PGW-C or may be expressed as simply an SMF.

Further, the AMF and a mobility management entity (MME), which is a node for mobility management in 4G network, may exchange information for supporting UE mobility between 5G-4G through an N26 interface.

A communication system (including a UE, a base station, and a core network (CN)) to be a target of the disclosure may operate based on a network slice. The network slice may be regarded as a logically separated network, and be composed of a set of NFs for supporting a network function. In the case that the network is operated based on a network slice, the network may be operated with different capacities, configurations, and policies for each network slice. In the disclosure, a quota may be introduced for each network slice, and include the number of maximum UEs that may be simultaneously accessed to a slice, the number of maximum sessions (PDU session or packet data network (PDN) connection) that may be created simultaneously and the maximum data rate in which a subscriber may use for each slice, and the quota is not limited thereto, and may include other types of parameters required for network operation, and the gist, operation, and constitution of the disclosure may be extended to these targets.

In the case that network slicing is to be used, it should be able to consider interworking of a 5G network that explicitly supports the concept of a network slice through standardized protocols and operations and a 4G network that does not explicitly support the concept of network slices through standardized protocols and operations. In particular, as described above, in the case that all or part of the network equipment (NF) is shared to ensure service continuity between the 5G network and the 4G network, the slice quota should be able to be applied to access not only 5G but also 4G, and should be able to be considered even in a movement situation between 5G-4G of the UE. Such an operation may be selectively applied to a user subscribed to a 5G service using a UE that can support 5G.

FIG. 3 is a diagram illustrating a control procedure in consideration of a slice quota when accessing a 4G network.

Step 1. After accessing the 4G wireless network (RAN), the UE may perform an attach process for receiving a 4G service or a process for creating a PDN connection in the case that the UE is already registered in a 4G Service (301). The UE may merge and perform an operation for establishing a PDN connection daring the attach process. The UE may include a desired access point name (APN) in a non-access stratum (NAS) request message transmitting to the MME in order to classify a service to be a target of session creation.

Step 2. The MME may perform a process for creating a session according to information received from the UE. In the case that the UE explicitly includes an APN in the message of step 1, the MME may determine whether the APN requested by the UE is allowed based on subscription information received from the HSS/UDM. In the case that the UE does not explicitly include the APN, the MME may use a default APN included in the subscription information received from the HSS/UDM or configured in the MME. The MME selects a gateway (GW; SGW, PGW) to process a session in consideration of the determined APN and other parameters, and the MME transmits a request message for session creation to a PGW-C+SMF (hereinafter, referred to as an SMF) (302), which may be transmitted to the SMF through the SGW. The create session request message transmitted by the MME may include the determined APN and an international mobile subscriber identity (IMSI) (ID) of the UE.

Step 3. The SMF may determine whether the APN may be supported through the received APN, and perform a procedure for receiving and applying a PCF (PCRF) and a session related policy, if necessary. The SMF may select a slice (single-network slice selection assistance information (S-NSSAI)) mapped to the APN, and select a slice through the NSSF during this process (303).

Step 4. In the case that it is necessary to consider a quota for the network slice, step 4 or less may be performed. This may be determined based on information configured in the SMF, a policy received from the PCF, or subscription information received from the UDM. This may be limitedly applied to specific subscribers or may be limitedly applied to specific S-NSSAI or APN. The SMF may identify a slice quota state with an NF (referred to as a counting NF in this disclosure, but the name may be a network slice quota management function, or a PCF, UDM, and unified data repository (UDR) among NFs that have previously provided other functions may include a corresponding function) for managing a slice quota and call a request message for identifying whether a user/session may be added to the slice with a transmission or request service (304). In this case, the request message sent by the SMF may include the selected S-NSSAI, a radio access technology (RAT) type to which the UE is currently accessed, an ID of a subscriber, a selected APN, a session ID, and the like. The RAT to which the UE is currently accessed may be indirectly indicated by other information included in the request message sent by the SMF. For example, when the ID of the subscriber is included in the request message sent by the SMF, the counting NF that has received the ID may determine the RAT accessed by the subscriber with 4G/LTE and perform a corresponding operation.

Step 5. The counting NF may determine whether the request received in step 4 may be accepted (305). In this case, the counting NF may perform a process of comparing a quota (the number of maximum UEs, the number of maximum sessions) currently configured for each slice with the number of actual UEs and sessions collected so far. In the case that slice use is allowed, the NF may update the UE/session state for each slice. As an example of such state update, in the case that access of the corresponding slice for the corresponding UE/subscriber (i.e., in the case that a first session is created) is the first, the number of UEs may be increased by 1. In the case that a new session is created for the corresponding slice, the number of sessions may be increased by 1. In the case that a session is newly added for the corresponding slice, but there is an existing created session, only the number of sessions ma be increased by 1. In the case that a session is newly added for the corresponding slice, but there is an existing created session, the number of UEs may not be increased.

Step 6/7. In the case that slice related state information needs to be stored in a separate NF or storage, the counting NF transmits a request for updating/storing state information to an NF that provides the corresponding function (306), and this message may include information for each slice (maximum/current quota information) and information on UE/subscriber/session to be a current target. In this case, the separate NF or storage may be a UDM or UDR or may be a network entity (NF) having state information of a slice. A separate NF that has received the message may return a response to the above state information update/storage to the counting NF (307). According to an embodiment, in the case that the NF providing the function is a UDM, the counting NF may transmit a request message to the UDM (306). If necessary, the UDM may store information for each slice and/or information on UE/subscriber/session to be a current target in the UDR. According to another embodiment, in the case that the NF providing the function is a UDR, the counting NF may transmit a request message to the UDR, which may be transmitted to the UDR through the UDM (306).

Step 8. The counting NF transmits a response indicating that the slice can be used, and in this case, information of the current slice may be transmitted together (308).

Step 9. The SMF may finally determine S-NSSAI to be transmitted to the UE (309).

Step 10. The SW transmits a create session response to the MME, and in this case, the selected S-NSSAI may be included in a protocol configuration option (PCO) (310). This message may be transmitted to the MME through the SGW.

Step 11. The MME transmits an acceptance message notifying that the attachment or session creation is allowed to the UE, and in this case, the MME may include the PCO received earlier in the acceptance message and transmit the acceptance message (311). Through the above process, the UE, finally receives S-NSSAI, and this information may be used for a registration process and other session processing in the case that the UE moves to the 5G network in the future.

FIG. 4 is a diagram illustrating a control procedure in consideration of a slice quota when accessing a 4G network.

Step 1. After accessing the 4G radio network (RAN), the UE may perform an attach process for receiving a 4G service, or a process for creating a PDN connection in the case that the UE is already registered in as 4G service (401). The UE may merge and perform an operation for establishing a PDN connection during the attach process. The UE may include a desired APN in a NAS request message transmitting to the MME in order to classify a service to be a target of session creation.

Step 2. The MME may perform a process for creating a session according to information received from the UE. In the case that the UE explicitly includes the APN in the message of step 1, the MME may determine whether the APN requested by the UE is allowed based on subscription information received from the HSS/UDM. In the case that the UE does not explicitly include the APN, the MME may use a default APN included in the subscription information received from the HSS/UDM or configured in the MME. The MME may select a GW (SGW, PGW) to process a session in consideration of the determined APN and other parameters, and the MME may transmit a request message for session creation to a PGW-C+SMF (hereinafter, referred to as an SMF) (402), which may be transmitted to the SMF through the SGW. The create session request message transmitted by the MME may include the determined APN and a subscriber ID (IMSI) of the UE.

Step 3. The SMF may determine whether the APN may be supported through the received APN and perform a procedure for receiving and applying a PCF (PCRF) and a session related policy, if necessary. The SMF may select a slice (S-NSSAI) mapped to the APN and select a slice through the NSSF during this process (403).

Step 4. In the case that it is necessary to consider a quota for the network slice, step 4 or less may be performed. This may be determined based on information configured in the SMF, a policy received from the PCF, or subscription information received from the UDM. This may be limitedly applied to specific subscribers or may be limitedly applied to specific S-NSSAI or APN. The SMF may identify a slice quota state with an NF (referred to as a counting NF in this disclosure, but the name may be a network slice quota management function, and the like, or a PCF, UDM, and UDR among, NFs that have previously provided other functions may include corresponding functions) for slice quota management and call a request service for identifying whether a user/session may be added to the slice (404). In this case, the request message sent by the SMF may include selected S-NSSAI, a RAT type to which the UE currently accesses, a subscriber ID, a selected APN, a session ID, and the like.

Step 5. If necessary, the counting NF may perform a process for determining state information of the current slice with a separate NF or storage (405). In this case, the separate NF or storage may be a UDM or a UDR or may be an NF having state information of a slice. The state in may include a quota configured for each slice (the number of maximum UEs, the number of maximum sessions), and the number of actual UEs and sessions collected so far. According to an embodiment, in the case that the NF providing the function is a UDM, the counting NF may transmit a request message to the UDM. If necessary, the UDM may store state information in the UDR. According to another embodiment, in the case that the NF providing the function is a UDR, the counting NF may transmit a request message to the UDR, which may be transmitted to the UDR through the UDM.

Step 6. In order to determine whether the request received in step 4 may be accepted, the counting NF may identify a quota configured for each slice (406). In this case, the counting NF may perform a process of comparing a quota (the number of maximum UEs, the number of maximum sessions) currently configured for each slice with the number of actual UEs and sessions collected so far. When a situation of the current slice reaches or exceeds the upper limit of the quota, a new UE or session cannot be accessed.

Step 7. In the case that the current slice situation reaches or exceeds the upper limit of the quota through the determination of step 6, the counting NF transmits a response that the slice cannot be used (407), and notifies together a cause (due to the limitation of the number of UEs or the limitation of the number of sessions). Further, in the case that it is intended to limit the request of the UE for a specific time, a back-off timer value may be transmitted together. The back-off may have separate values for limiting the number of UEs (mobility management) and limiting the number of sessions (session management), and be transmitted together with a cause in order to distinguish the two.

Step 8. The SMF may finally determine a rejection cause of the session creation request to be notified to the MME, and configure a back-off timer value in consideration of the previously received timer (408).

Step 9. The SMF transmits a create session response to the MME (409), and in this case, the create session response includes a cause indicating that the request has been rejected. Further, the create session response may include a back-off timer value. This message may be transmitted to the MME through the SGW. In this case, the response may be a reject message.

Step 10. Even in the case that session creation is rejected based on the message received from the SMF, the MME may determine whether attach is possible, and determine one of a mobility management (MM) back-off timer and a session management (SM) back-off timer according to whether a configuration value of the back-off timer is due to the limitation of the number of quota UEs in the slice or the limitation of the number of quota sessions of the slice (410).

Step 11. The MME transmits a message indicating that attach or session creation is rejected to the UE (411), and in this case, the message may include a cause indicating whether it is because of the limitation of the number of quota UEs of the slice (mobility management) or the limitation of the number of quota sessions of the slice (session management). Further, the message may include the back-off timer determined in step 10. Further, in the case that the UE does not explicitly request the APN in step 1, the MME may select the APN and explicitly notify the UE the APN, which is the target of rejection.

Step 12. In the case that the connection request is rejected and the UE receives the back-off timer, the UE starts the back-off timer and should not transmit the request while the timer is executed (412). In the case that the UE explicitly specifies and requests the APN in step 1 and receives a rejection, the UE cannot transmit the request for the APN until the back-off timer expires. In the case that the APN is not explicitly requested, and in the case that the UE receives the APN through the message of step 11, the UE cannot transmit the session management request for the APN until the back-off timer expires. In the case that the APN is not requested/received or the mobility management rejection for the attach request is received as a cause, the UE may not transmit the mobility management request until the back-off timer expires. The back-off timer of the UE may be applied as it is even in the case that a cell change, mobility, or RAT change (movement to a 5G network, and the like) of the UE occurs.

FIG. 5 is a diagram illustrating a control procedure in consideration of a slice quota when accessing a 4G network.

Step 1. After accessing the 4G radio network (RAN), the UE may perform an attach process for receiving a 4G service, or a process for creating a PDN connection in the case that the UE is already registered in a 4G service (501). The UE may merge and perform an operation for establishing a PDN connection during the attach process. The UE may include a desired APN in a NAS request message transmitting to the MME in order to classify a service to be a target of session creation.

Step 2. The MME may perform a process for creating a session according to information received from the UE. In the case that the UE explicitly includes the APN in the message of step 1, the MME may determine whether the APN requested by the UE is allowed based on subscription information received from the HSS/UDM. In the case that the UE does not explicitly include the APN, the MME may use a default APN included in subscription information received from the HSS/UDM or configured in the MME. The MME may select a GW (SGW, PGW) to process a session in consideration of the determined APN and other parameters and transmit a request message for session creation to a PGW-C+SMF (hereinafter, referred to as an SMF) (502), which may be transmitted to the SMF through the SGW. A create session request message transmitted by the MME may include the determined APN and a subscriber ID (IMSI) of the UE.

Step 3. The SMF may determine whether the APN may be supported through the received APN and perform a procedure for receiving and applying a PCF (PCRF) and a session related policy, if necessary. The SMF may select a slice (S-NSSAI) mapped to the APN, and select a slice through the NSSF during this process (503).

Step 4. In the case that it is necessary to consider a quota for the network slice, step 4 or less may be performed. This may be determined based on information configured in the SMF, a policy received from the PCF, or subscription information received from the UDM. This may be limitedly applied to specific subscribers or may be limitedly applied to specific S-NSSAI or APN. The SMF may identify a slice quota state with an NF (referred to as a counting NF in this disclosure, but the name may be a network slice quota management function, and the like, or a PCF, UDM, and UDR among NFs that have previously provided other functions may include the corresponding function) for slice quota management, and call a request service for identifying whether a user/session may be added to the slice (504). In this case, the request message sent by the SMF may include the selected S-NSSAI, a RAT type to which the UE is currently accessed, a subscriber ID, a selected APN, a session ID, and the like.

Step 5. If necessary, the counting NF may perform a process for determining state information of the current slice with a separate NF or storage (505). In this case, the separate NF or storage may be a UDM or a UDR or may be an NF having state information of a slice. The state information may include a quota configured for each slice (the number of maximum UEs, the number of maximum sessions), and the number of actual UEs and sessions collected so far. According to an embodiment, in the case that the NF providing the function is a UDM, the counting NF may transmit a request message to the UDM. If necessary, the UDM may store state information in the UDR. According to another embodiment, in the case that the NF providing the function is a UDR, the counting NF may transmit a request message to the UDR, which may be transmitted to the UDR through the UDM.

Step 6. In order to determine whether the request received in step 4 may be accepted, the counting NF may identify a quota configured for each slice (506). In this case, the counting NF may perform a process of comparing a quota (the number of maximum UEs, the number of maximum sessions) configured for each slice with the number of actual UEs and sessions collected so far. When a situation of the current slice reaches or exceeds the upper limit of the quota, the counting NF may not access a new UE or session.

Step 7. In the case that the current slice situation reaches or exceeds the upper limit of the quota through the determination of step 6, the counting NF transmits a response that the slice cannot be used (507), and notifies together a cause (due to the limitation of the number of UEs or the limitation of the number of sessions). In the case that the UE is replaced with another slice or APN, when the service may be provided, the NF may notify the SMF of the selected APN information.

Step 8. In the case that it is possible to replace the APN, the SMF may determine an APN to be replaced (508), and in this case, the SMF may use an internal configuration, subscription information received from the UDM/HSS, APN policy received from the PCF, or APN information received in step 7.

Step 9. The SMF transmits a create session response to the MME (509), and in this case, the create session response may include a cause indicating that the request is rejected. Further, in the case that the APN to be replaced is determined, the SMF may notify the MME of this. This message may be transmitted to the MME through the SGW.

Step 10. The MME may know that the request has been rejected and determine whether to provide a service through APN replacement (510). This may be determined using an MME internal configuration, subscription information received from the UDM/HSS, or information received in step 9. In the case that the APN is replaced, by transmitting again a create session request to the SMF, the MME may request to create a session, and in this case, the procedure from step 2 302 of FIG. 3 may be repeated. In this case, S-NSSAI for the APN replaced by the MME is selected by the SMF and transmitted to the UE through the PCO. Further, the network may not explicitly notify the replaced APN to the UE.

Even if the counting NF notifies the APN to be replaced in step 7 or the SMF does not notify the APN to be replaced in step 8, APN replacement may be applied by the determination of the MME. In this case, in the case that the session creation request is rejected through step 8, the MME may determine APN replacement, select the APN, and perform the session creation request.

Figure 6:
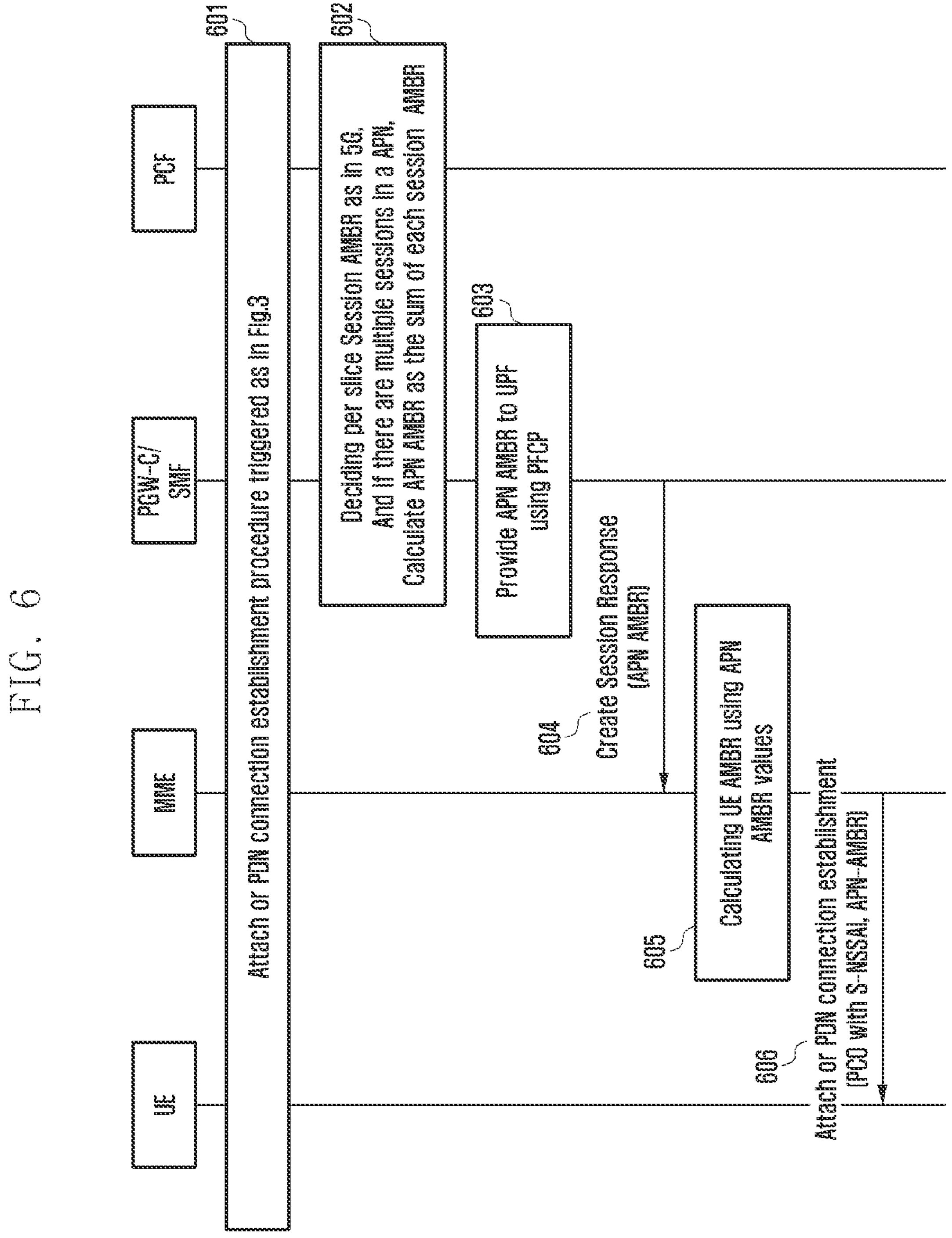
FIG. 6 is a message flow diagram illustrating a control procedure in consideration of a slice quota when accessing a 4G network according to an embodiment of the disclosure.

FIG. 6 illustrates a control procedure in consideration of a slice quota when accessing a 4G network.

Step 1. The UE may perform a PDN connection creation process for accessing a 4G network or an attach process in which a PDN connection creation request is merged (601). This corresponds to steps 1 to 3 of FIG. 3.

Step 2. The SMF that has received the session creation request may determine whether slice access or session creation is possible for the UE according to the preceding embodiments, and in the case that slice access or session creation is possible for the UE, the SMF may determine per slice aggregated maximum bit rate (per slice AMBR) for the UE (602). In this case, the per slice AMBR indicates the maximum bit rate of data in which one UE may transmit and receive through one slice. In this case, in the case that the SMF may determine an AMER in units of the APN, the SMF may calculate immediately the AMBR. In the case that two or more PDN connections may be created for one slice and APN and per slice session AMBR may be determined for each session/connection similar to 5G, the SMF may determine per slice APN-AMBR with the sum of AMBRs of sessions belonging to the same slice. In the case that two or more SMFs support on slice or SMFs of each session are different, the above calculation may be performed by the PCF instead of the SMF.

Step 3. The transmits the calculated per slice APN-AMBR, to the UPF through a PFCP message (603). In the case that the 4G network does not support explicit per slice APN-AMBR, the calculated per slice APN-AMBR may be replaced with APN-AMBR and transmitted.

Step 4. The SMF may transmit the calculated per slice APN AMBR to the MME through an allowed APN-AMBR field of a create session response message (604). This message may be transmitted to the MME through the SGW.

Step 5. The MME may store the received APN-AMBR and include the APN-AMBR in a NAS response message sending to the UE. Further, the MME may update an UE-AMBR using the received. APN-AMBR (605).

Step 6. The MME may transmit a response message indicating that an attach of PDN connection creation request has been accepted to the UE (606). This message may include S-NSSAI inserted into the PCO by the SMF, and include an APN-AMBR calculated in consideration of a quota for each slice for the created session.

In describing the above embodiments, it has been described that slice related information is included in a NAS response message to a request of the UE, but this may be expressed in the form of a message requested by the NW instead of the response message. More specifically, in the embodiment included in FIG. 3, a response message of step 11 to the session creation request of the UE in step 1 may be regarded as a response message from the viewpoint of the UE, but in reality, when session creation is in progress in the network, the response message may be transmitted in the form of a network-triggered request for creating default bearer.

Figure 7:
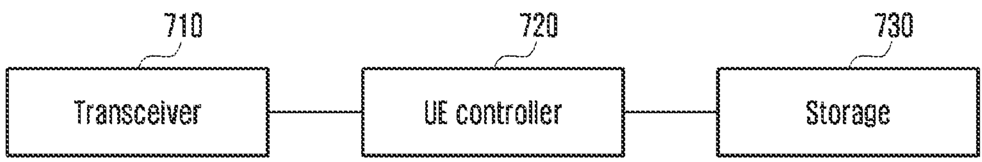
FIG. 7 is a block diagram illustrating a terminal device according to embodiments of the disclosure.

FIG. 7 is a block diagram illustrating a structure of a UE according to embodiments of the disclosure.

With reference to FIG. 7, the UE may include a transceiver 710, a UE controller 720, and a storage 730. In the disclosure, the UE controller 820 may be defined as a circuit, an application specific integrated circuit, or at least one processor.

The transceiver 710 may transmit and receive signals to and from other network entities. The transceiver may receive, for example, system information from a base station, and receive a synchronization signal or a reference signal, or control information and data on a UE.

The UE controller 720 may control the overall operation of the UE according to the embodiment proposed in the disclosure. For example, the UE controller may control a signal flow between blocks to perform an operation according to the above-described drawings and message flow diagrams. Specifically, the UE controller may operate according to a control signal from the base station and transmit and receive messages or signals to and from the UE and/or network entity.

The storage 730 may store at least one of information transmitted and received through the transceiver 710 or information generated through the UE controller.

Figure 8:
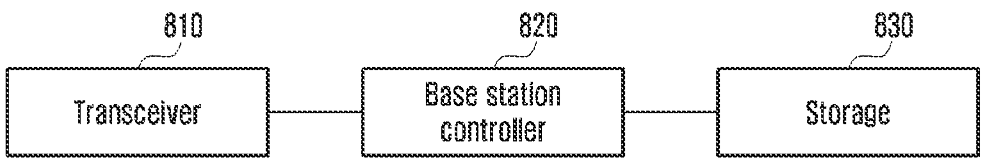
FIG. 8 is a block diagram illustrating a base station device according to embodiments of the disclosure.

FIG. 8 is a block diagram illustrating a structure of a base station according to embodiments of the disclosure.

With reference to FIG. 8, the base station may include a transceiver 810, a base station controller 820, and a storage 830. In the disclosure, the base station controller 820 may be defined as a circuit, an application specific integrated circuit, or at least one processor.

The transceiver 810 may transmit and receive signals to and from other network entities. The transceiver may transmit, for example, system information, a synchronization signal or a reference signal, or control information and data on the UE to the UE, and transmit and receive control information and data for providing a service to the UE from the NF. The base station controller 820 may control the overall operation of the base station according to the embodiment proposed in the disclosure. For example, the base station controller may control a signal flow between blocks to perform an operation according to the above-described drawings and message flow diagrams. Specifically, the base station controller may transmit and receive messages or signals to and from the UE, the base station, and/or the network entity.

The storage 830 may store at least one of information transmitted and received through the transceiver or information generated through the base station controller.

Figure 9:
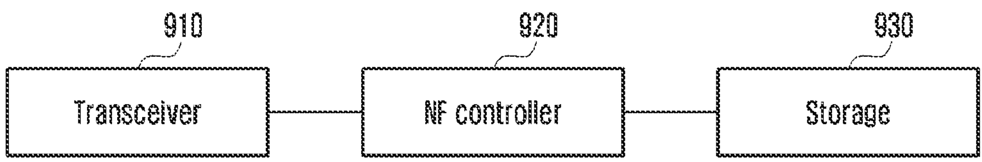
FIG. 9 is a block diagram illustrating an NF device according to embodiments of the disclosure.

FIG. 9 is a block diagram illustrating a structure of an NF (including an NF instance) according to an embodiment of the disclosure.

The NF illustrated in FIG. 9 may mean at least one of the above-described MME, AMF, SMF, counting NF, UDM, or PCF, and is not limited to a specific NF. Further, the NF may be provided in the form of an instance, and in the case that the NF is provided as an instance, the NF exists in the form of software code, and may mean an executable state by receiving allocation of physical and/or logical resources from a computing system in order to perform a function of the NF in a physical computing system, for example, a specific computing system existing on a core network; thus, the structure of FIG. 9 may mean a physical division or a logical division.

With reference to FIG. 9, the NF may include a transceiver 910, an NF controller 920, and a storage 930.

The transceiver 910 may transmit and receive signals to and from other network entities. The transceiver may transmit and receiver, for example, system information to and from another network entity (NF) or a base station (RAN), and transmit and receive control information and data on the UE.

The NF controller 920 may control the overall operation of the NF according to the embodiment proposed in the disclosure.

The storage 930 may store at least one of information transmitted and received through the transceiver or information generated through the NF controller.

Methods according to the embodiments described in the claims or specifications of the disclosure may be implemented in the form hardware, software, or a combination of hardware and software.

In the case of being implemented in software, as computer readable storage medium storing one or more programs (software modules) may be provided. One or more programs stored in the computer readable storage medium are configured for execution by one or more processors in an electronic device. The one or more programs include instructions for enabling an electronic device to execute methods according to embodiments described in claims or specifications of the disclosure.

Such programs (software are modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), another form of optical storage device, or a magnetic cassette. Alternatively, the programs may be stored in a memory formed with a combination of some or all thereof. Further, each constitution memory may be included in the plural.

Further, the program may be stored in an attachable storage device that may access through a communication network such as the Internet, Intranet, local area network (LAN), wide area network (WAN), or storage area Network (SAN), or a communication network formed with a combination thereof. Such a storage device may access a device implementing an embodiment of the disclosure through an external port. Further, a separate storage device on a communication network may access a device implementing the embodiment of the disclosure.

In the specific embodiments of the disclosure described above, components included in the disclosure were expressed in the singular or plural according to the suggested specific embodiments. However, the singular or plural expression is appropriately selected for a situation suggested for convenience of description, and the disclosure is not limited to the singular or plural component, and even if a component is represented in the plural, it may be formed with the singular, or even if a component is represented in the singular, it may be formed with the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as equivalents to the claims.

The invention claimed is:

1. A method performed by a first network function entity (SMF+PGW-C) including a session management function (SMF) and a control plane function (PGW-C) of a packet data network gateway (PGW) in a wireless communication system, the method comprising:

receiving, from a mobility management entity (MME), a first message requesting packet data network (PDN) connection establishment;

selecting a network slice related to the PDN connection establishment;

transmitting, to a second network function entity for a management on network slice admission, a second message requesting to check an availability of the network slice;

receiving, from the second network function entity, a third message including information on the availability of the network slice; and transmitting, to the MME, a fourth message including a response to the PDN connection establishment based on the third message, wherein the second message comprises an ID of the terminal requesting the PDN connection establishment.

2. The method of claim 1, wherein selecting a network slice related to the PDN connection establishment further comprises determining whether access of the selected network slice is controlled by the second network function entity based on information configured in the first network function entity.

3. The method of claim 1, wherein if the terminal ID is not registered in the network slice, and the number of registered terminals and the number of current PDU sessions are smaller than the number of maximum terminals and the number of maximum PDU sessions of the network slice, the terminal ID is registered in the network slice, and the number of registered terminals and the number of current PDU sessions are increased by 1, and the third message comprises information that the network slice is available.

4. The method of claim 1, wherein if the terminal ID is already registered in the network slice and the number of current PDU sessions is smaller than the number of maximum PDU sessions of the network slice, the number of current PDU sessions is increased by 1, and the third message comprises information that the network slice is available.

5. A method performed by a second network function entity for performing management of network slice admission in a wireless communication system, the method comprising:

receiving a first message requesting to check an availability of a network slice from a first network function entity (SMF+PGW-C) comprising a session management function (SMF) and a control plane function (PGW-C) of a packet data network gateway (PGW);

checking the availability of the network slice based on a terminal ID included in the first message, the number of terminals registered in the network slice, and the number of current PDU sessions of the network slice; and transmitting, to the first network function entity, a second message including information on the availability of the network slice, wherein the network slice is related to a packet data network (PDN) connection establishment request from a mobility management entity (MME), the terminal ID included in the first message is an ID of a terminal requesting the PDN connection establishment, and the PDN connection of the first network function entity and the MME is established based on the second message.

6. The method of claim 5, wherein the network slice is configured to identify whether access is controlled by the second network function entity based on information configured in the first network function entity.

7. The method of claim 5, wherein checking the availability of the network slice further comprises:

identifying whether the terminal ID is registered in the network slice;

comparing the number of registered terminals and the number of current PDU sessions with the number of maximum terminals and the number of maximum PDU sessions of the network slice;

registering, if the terminal ID is not registered in the network slice and the number of registered terminals and the number of current PDU sessions are smaller than the number of maximum terminals and the number of maximum PDU sessions of the network slice, the terminal ID in the network slice and increasing the number of registered terminals and the number of current PDU sessions by 1; and increasing, if the terminal ID is already registered in the network slice and the number of current PDU sessions is smaller than the number of maximum PDU sessions of the network slice, the number of current PDU sessions by 1.

8. A first network function entity (SMF+PGW-C) including a session management function (SMF) and a control plane function (PGW-C) of a packet data network gateway (PGW) in a wireless communication system, the first network function entity (SMF+PGW-C) comprising:

a transceiver configured to transmit and receive a signal; and a controller connected to the transceiver, wherein the controller is configured to:

receive, from a mobility management entity (MME), a first message requesting packet data network (PDN) connection establishment, select a network slice related to the PDN connection establishment, transmit, to a second network function entity for a management on network slice admission, a second message requesting to check an availability of the network slice, receive, from the second network function entity, a third message including information on the availability of the network slice, and transmit, to the MME, a fourth message including a response to the PDN connection establishment based on the third message, wherein the second message comprises an ID of the terminal requesting the PDN connection establishment.

9. The first network function entity of claim 8, wherein the controller is configured to determine whether access of the selected network slice is controlled by the second network function entity based on information configured in the first network function entity.

10. The first network function entity of claim 8, wherein if the terminal ID is not registered in the network slice, and the number of registered terminals and the number of current PDU sessions are smaller than the number of maximum terminals and the number of maximum PDU sessions of the network slice, the terminal ID is registered in the network slice and the number of registered terminals and the number of current PDU sessions are increased by 1, and the third message comprises information that the network slice is available.

11. The first network function entity of claim 8, wherein if the terminal ID is already registered in the network slice and the number of current PDU sessions is smaller than the number of maximum PDU sessions of the network slice, the number of current PDU sessions is increased by 1, and the third message comprises information that the network slice is available.

12. A second network function entity for performing management of network slice admission in a wireless communication system, the second network function entity comprising:

a transceiver configured to transmit and receive a signal; and a controller connected to the transceiver, wherein the controller is configured to:

receive, from a first network function entity (SMF+PGW-C) comprising a session management function (SMF) and a control plane function (PGW-C) of a packet data network gateway (PGW), a first message requesting to check an availability of a network slice, check the availability of the network slice based on a terminal ID included in the first message, the number of terminals registered in the network slice, and the number of current PDU sessions of the network slice, and transmit, to the first network function entity, a second message including information on the availability of the network slice, wherein the network slice is related to a packet data network (PDN) connection establishment request from a mobility management entity (MME), the terminal ID included in the first message is an ID of the terminal requesting the PDN connection establishment, and the PDN connection of the first network function entity and the MME is established based on the second message.

13. The second network function entity of claim 12, wherein the network slice is configured to identify whether access is controlled by the second network function entity based on information configured in the first network function entity.

14. The second network function entity of claim 12, wherein the controller is configured to:

identify whether the terminal ID is registered in the network slice, and compare the number of registered terminals and the number of current PDU sessions with the number of maximum terminals and the number of maximum PDU sessions of the network slice.

15. The second network function entity of claim 14, wherein if the terminal ID is not registered in the network slice, the number of registered terminals and the number of current PDU sessions are smaller than the number of maximum terminals and the number of maximum PDU sessions of the network slice, the controller is configured to register the terminal ID in the network slice and to increase the number of the registered terminal and the number of the current PDU session by 1, and if the terminal ID is already registered in the network slice and the number of current PDU sessions is smaller than the number of maximum PDU sessions of the network slice, the controller is configured to increase the number of current PDU sessions by 1.

* * * * *